Feb. 15, 1938.  F. M. TROUTNER  2,108,696
MIXING AND MOLDING DEVICE
Original Filed Oct. 24, 1935  2 Sheets-Sheet 1

Inventor
F. M. Troutner

By Clarence A. O'Brien
Hyman Berman
Attorneys

Feb. 15, 1938.   F. M. TROUTNER   2,108,696
MIXING AND MOLDING DEVICE.
Original Filed Oct. 24, 1935   2 Sheets—Sheet 2

Inventor
F. M. Troutner

By Clarence A. O'Brien
Hyman Berman
Attorneys

Patented Feb. 15, 1938

2,108,696

UNITED STATES PATENT OFFICE 2,108,696

MIXING AND MOLDING DEVICE

Franklin M. Troutner, San Jose, Calif.

Application October 24, 1935, Serial No. 46,595
Renewed November 2, 1937

2 Claims. (Cl. 31—35)

This invention is a device for mixing and molding, and especially for mixing the coloring matter into the uncolored oleomargarine and for molding the material immediately subsequent to the mixing operation so that the mixture emerges from the machine in substantially block form or other desired shape.

Among the objects of the invention are to provide a device of this character characterized by extreme simplicity of construction and facility of operation.

The invention together with its objects and advantages will be best understood from a study of the following description taken in connection with the accompanying drawings wherein.

Figure 1:
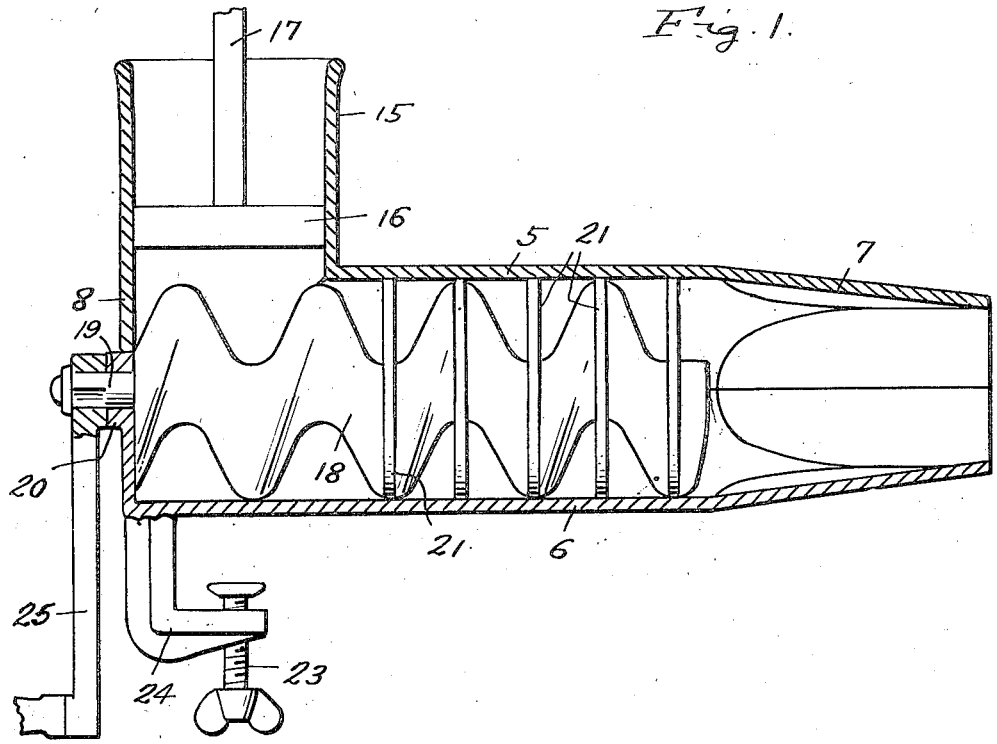
Figure 1 is a sectional view through the mixing and molding device, certain parts being shown in elevation.
Figure 3:
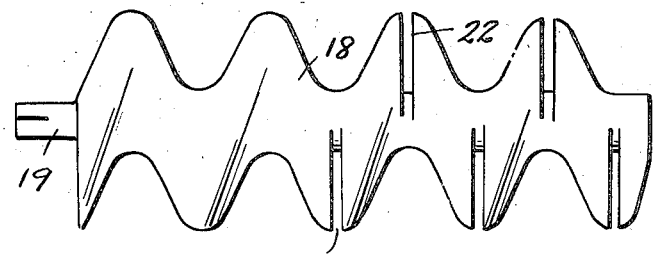
Figure 3 is an elevational view of the auger.
Figure 2:
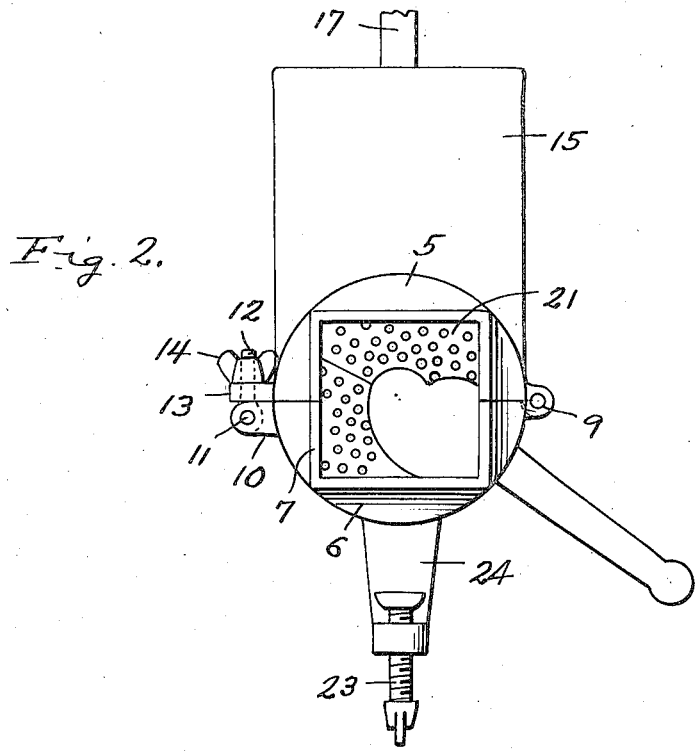
Figure 2 is an end elevational view of the device with certain parts broken away.
Figure 4:
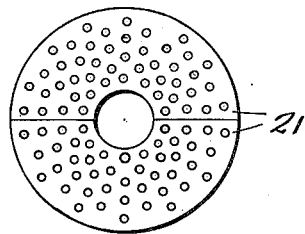
Figure 4 is a plan view of a two-part sectional plate.

Referring to the drawings by reference numerals it will be seen that the mixing and molding device comprises a tubular member consisting of a pair of complemental half sections 5 and 6 which at one end, that is to say at the discharge end of the tubular member is tapered as at 7 and is substantially square in end elevation.

The members 5 and 6 at the closed end 8 thereof are hingedly connected together at one side as at 9.

On the side thereof opposite to the hinge 9 the section 6 is provided with a bifurcated lug 10 to which is pivoted as at 11 a bolt 12 adapted to be accommodated in the furcation of a bifurcated lug 13 on the corresponding side of the section 5. A thumb nut or the like 14 is threadedly engaged with the bolt 12 for securing the section in closed assembled position.

Provided on the section 5 and secured thereto in any suitable manner, preferably by being integral therewith, is a hopper 15 disposed at the closed end of the tube.

Mounted for reciprocation within the hopper 15 is a plunger 16 equipped with a suitable stem 17 to facilitate reciprocatory movement of the plunger 16. Obviously the plunger may be either power driven or hand operated as found desirable.

Operating within the member formed by the sections 5 and 6 is an auger or screw conveyor 18. At one end thereof the auger or screw conveyor 18 has a stub shaft 19 journalled in a suitable bearing 20, and secured to the stub shaft 19 in any suitable manner is a crank or handle 25. For substantially one half of the length thereof the vanes of the auger 18 are slotted as at 22 to accommodate perforated disks 21.

The disks 21 have a working fit within the cylinder formed by the sections 5 and 6 and each of the disks is provided with the perforations as shown and is split into two complemental half sections to facilitate the engagement of the disk with the slotted vanes of the auger 18 as clearly shown.

For securing the device to a table top or similar support there is secured to the section 6 at the closed end thereof, and in any suitable manner, preferably by being integral therewith, a substantially L-shaped clamp 24 with which is threadedly engaged a clamping screw 23.

The utility and advantages of the invention will be had from the following: After the coloring matter has been distributed over the oleomargarine, the material is placed in the hopper 15 and the plunger 16 then forced downwardly for feeding the material through the hopper into the cylinder. The auger 18 is rotated as the material is fed into the cylinder, and obviously as the auger 18 rotates the material is thoroughly mixed together and is forced lengthwise toward the end 7 of the cylinder, the material passing through the perforations in the disks 21. As the material passes through the discharge end 7 of the machine it is molded into shape and as the molded material passes from the end 7 of the machine it is cut into cubes of any length.

Obviously when subjected to the action of the blades of the auger 18, and when forced through the perforations of the disks 21 the material will be thoroughly mixed prior to the molding thereof as it enters the end 7 of the device.

Having thus described the invention, what is claimed as new is:

1. In a device of the character described, an elongated cylinder having a tapered end terminating in a substantially square discharge opening, a hopper connected with the cylinder at the end remote from said discharge opening, a plunger mounted for reciprocation in the hopper for forcing material from the hopper into the cylinder, an auger rotatably mounted in the cylinder for mixing the material and for forcing the latter lengthwise through the cylinder towards the discharge end of the latter, a plurality of perforated disks mounted in spaced relation in advance of the discharge end of the auger and through which the material is forced to pass, and means interfitting said disks with the vanes of the auger.

2. In a device of the character described, an elongated cylinder having a tapered end terminating in a substantially square discharge opening, a hopper connected with the cylinder at the end remote from said discharge opening, a plunger mounted for reciprocation in the hopper for forcing material from the hopper into the cylinder, and an auger rotatably mounted in the cylinder for mixing the material and for forcing the latter lengthwise through the cylinder towards the discharge end of the latter, said auger having certain of its vanes provided with slots, and a series of spaced disks arranged within said cylinder and having a working fit within said cylinder and also engaged in said slots.

FRANKLIN M. TROUTNER.